US008799026B2

(12) United States Patent
Rehor et al.

(10) Patent No.: US 8,799,026 B2
(45) Date of Patent: Aug. 5, 2014

(54) SYSTEM FOR FUNDING THIRD-PARTY-ADMINISTERED LOSSES

(75) Inventors: Jeffrey T. Rehor, Enfield, CT (US); Kim R. Steinke, Torrington, CT (US); Kenneth W. Williams, Windsor, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 244 days.

(21) Appl. No.: 12/639,477

(22) Filed: Dec. 16, 2009

(65) Prior Publication Data

US 2011/0145019 A1 Jun. 16, 2011

(51) Int. Cl.
*G06Q 40/00* (2012.01)
(52) U.S. Cl.
USPC .............................................. 705/4
(58) Field of Classification Search
USPC .............................................. 705/4
See application file for complete search history.

(56) References Cited

U.S. PATENT DOCUMENTS

| | | | |
|---|---|---|---|
| 6,208,973 B1 * | 3/2001 | Boyer et al. | 705/2 |
| 6,343,271 B1 | 1/2002 | Peterson et al. | |
| 7,567,938 B1 * | 7/2009 | Frederickson et al. | 705/39 |
| 2002/0004731 A1 * | 1/2002 | Belben | 705/4 |
| 2002/0111886 A1 | 8/2002 | Chenevich et al. | |
| 2002/0111915 A1 | 8/2002 | Clemens et al. | |
| 2003/0163418 A1 | 8/2003 | Marks | |
| 2005/0246268 A1 | 11/2005 | Foran et al. | |
| 2006/0106650 A1 * | 5/2006 | Bush | 705/4 |
| 2008/0222035 A1 * | 9/2008 | Compiano | 705/40 |

OTHER PUBLICATIONS

Some Problems Related to Life Insurance Receiverships Nerlove, S H. Journal of Risk and Insurance (pre-1986) (Dec. 29, 1933): 1.*
Afternoon Session Proposed Revision of the Standard Fire Insurance Policy With Special Reference to Moral Hazard Clauses Goble, George W. Journal of Risk and Insurance (pre-1986) 4.1 (Mar. 1937): 37.*
Liability At Law and Insurance Against It Sawyer, E W. Journal of Risk and Insurance (pre-1986) 4.1 (Mar. 1937): 72.*

* cited by examiner

*Primary Examiner* — Hani M Kazimi
*Assistant Examiner* — Hatem M Ali
(74) *Attorney, Agent, or Firm* — McCormick, Paulding & Huber LLP

(57) ABSTRACT

A computerized system for funding third-party-administered insurance claims includes at least one processor configured to provide a claim data throughput module for receiving at least one claim transaction from at least one third party administrator, an administrative services module for receiving at least one bank transaction from at least one third party administration, for passing at least one bank transaction to a bank, and for receiving at least one paid file from a bank, and a transactions matching engine for validating at least one bank transaction based upon at least one claim transaction, and for determining completion of at least one bank transaction based upon at least one paid file.

20 Claims, 5 Drawing Sheets

SYSTEM FOR FUNDING THIRD-PARTY-ADMINISTERED LOSSES

FIELD OF THE INVENTION

The present invention relates to insurance claims processing and, more particularly, to reconciliation and funding of third-party-administered claim transactions.

BACKGROUND OF THE INVENTION

Insurance is a business of protecting and helping after the occurrence of an accident, loss or tragedy. In the event of an accident or loss, a policyholder or a third-party claimant can obtain payments or benefits, as provided in an insurance policy, by filing an insurance claim with the issuing insurance company. Many insurance companies employ certain third parties or TPAs to handle insurance claims, including tasks such as verifying the amount of the claim to be paid and ensuring that the claim is timely paid.

TPAs provide skill and cost efficiencies for insurance companies, but can introduce delays in claim resolution and unwanted complexity in claim reconciliation. In particular, problems can arise in transferring funds from an insurance company to a policyholder through a TPA-administered escrow account. The most common problems relate to timing issues, where insurance company money is advanced to a non-insurer-owned escrow account and then remains in the account. Representative problems include undue exposures to bank capitalization risks and to risks of garnishment or seizure related to TPA financial exposures, and also include opportunity costs imposed on the insurer by reduced cash liquidity. Additionally, TPA ownership of escrow accounts complicates insurer participation in a "positive pay" type process for disbursing funds to claimants. However, insurer ownership of escrow accounts comes with its own problems, including challenges of real-time transaction and balance tracking and reconciliation. Accordingly, it is desirable to have a system for handling third-party-administered insurance claims, wherein insurance company money can be held in an insurer-owned account and can move promptly to policyholders on resolution of a claim.

SUMMARY OF THE INVENTION

According to an embodiment of the present invention, a computerized system for funding third-party-administered insurance claims includes at least one processor configured to provide a claim data throughput module for receiving at least one claim transaction from at least one third party administrator, an administrative services module for receiving at least one bank transaction from at least one third party administration, for passing at least one bank transaction to a bank, and for receiving at least one paid file from a bank, and a transactions matching engine for validating at least one bank transaction based upon at least one claim transaction, and for determining completion of at least one bank transaction based upon at least one paid file.

According to another embodiment of the present invention, a computer-readable medium is encoded with instructions for configuring at least one processor as a claim data throughput module for receiving at least one claim transaction from at least one third party administrator, as an administrative services module for receiving at least one bank transaction from at least one third party administration, for passing at least one bank transaction to a bank, and for receiving at least one paid file from a bank, and as a transactions matching engine for validating at least one bank transaction based upon at least one claim transaction, and for determining completion of at least one bank transaction based upon at least one paid file.

According to a further embodiment of the present invention, a computer-implemented method for funding third-party-administered claim transactions includes receiving at least one claim transaction from at least one third party administrator at a processor configured to implement a claims data throughput module; generating at least one claim transaction based on at least one claim transaction via a processor configured to implement a bank lookup process; receiving at least one bank transaction from at least one third party administrator at a processor configured to implement an administrative services module; validating at least one bank transaction with at least one claim transaction via a processor configured to implement a transactions matching engine; receiving at least one paid file from at least one bank at a processor configured to implement an administrative services module; and verifying completion of at least one validated bank transaction in a processor configured to implement a transactions matching engine, based on at least one paid file.

These and other objects, features and advantages of the present invention will become apparent in light of the detailed description of the best mode embodiment thereof, as illustrated in the accompanying drawings.

DESCRIPTION OF PREFERRED EMBODIMENTS

Figure 1:
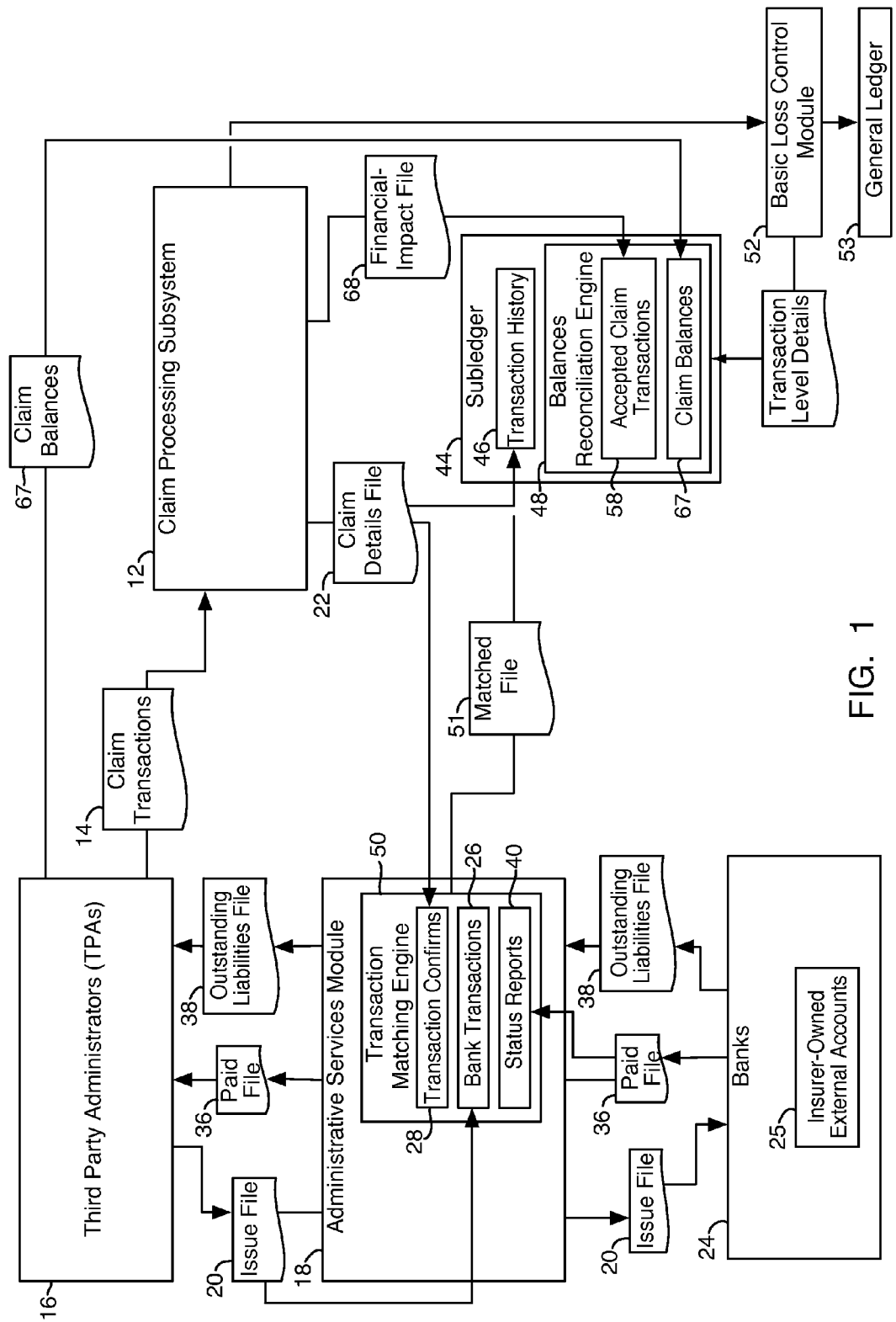
FIG. 1 is a schematic illustration of a computerized system for funding third-party-administered insurance claims, according to an embodiment of the present invention.
Figure 2:
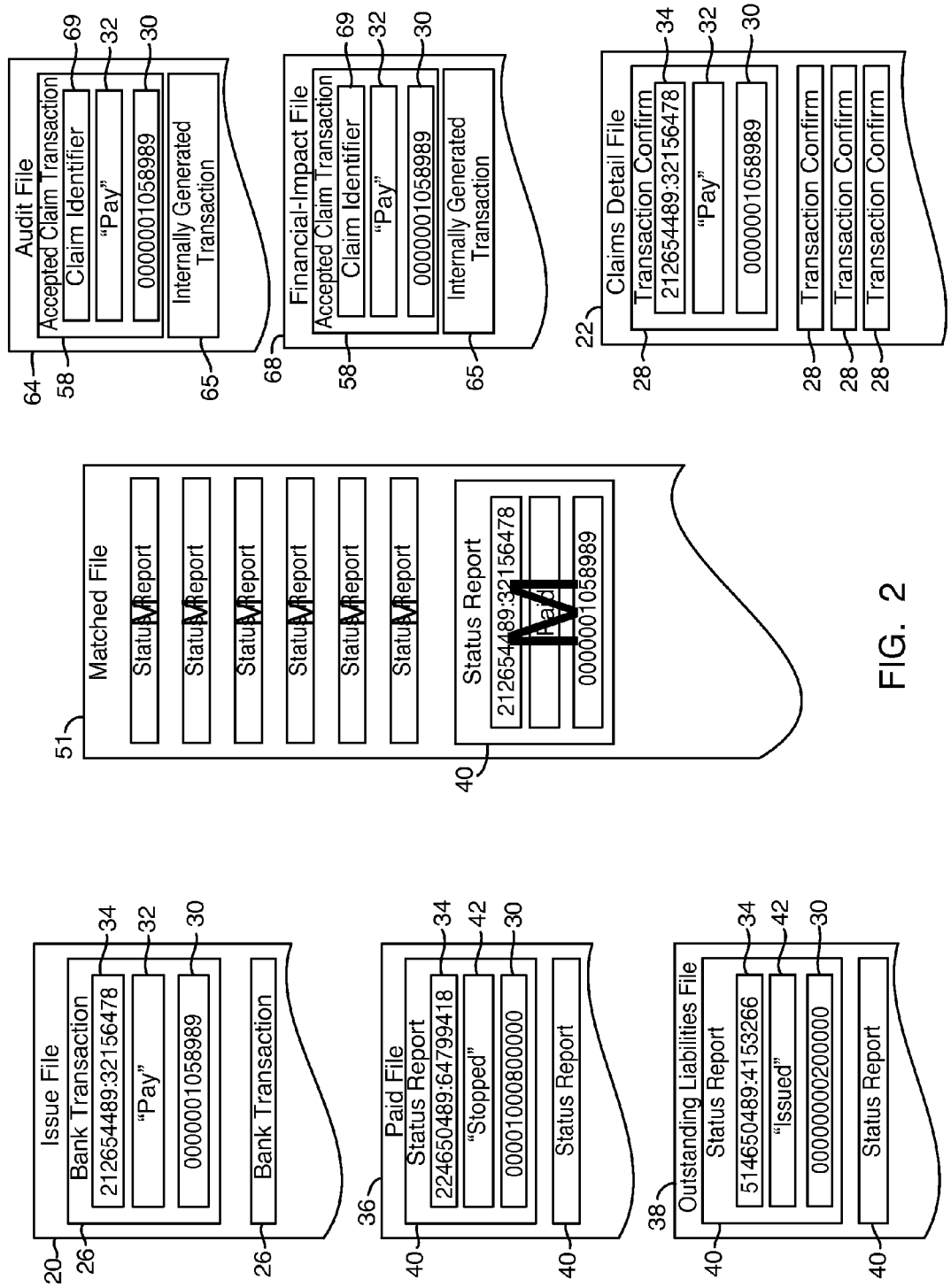
FIG. 2 is a schematic illustration of a variety of files used and produced by the system shown in FIG. 1.

Referring to FIG. 1, a computerized system 10 for funding third-party-administered insurance claims includes a claim processing subsystem 12 for receiving claim transactions 14 from a plurality of third-party administrators (TPAs) 16. The claim transactions 14 can include, by way of example and without limitation, payment requests, stop payments, recoveries, and escheat. The computerized system 10 also includes an administrative services module 18, which receives a plurality of issue files 20 from the plurality of TPAs 16 and also receives a claims detail file 22 from the claim processing subsystem 12. The administrative services module 18 passes the issue files 20 to a plurality of banks 24. Referring to FIG. 2, each issue file 20 includes a plurality of bank transactions 26. Each claims detail file 22 includes a plurality of transaction confirms 28. Each of the bank transactions 26 and the transaction confirms 28 includes a transaction amount 30, a transaction code 32, and bank information 34. Each transaction code 32 can be, for example, any of "pay", "stop", "void", or "escheat", and relates to an action to be taken with regard to an external account 25 held through one of the banks 24. The bank information 34 can include ABA routing numbers, account numbers, access codes, User IDs, PINs, authorized agent biometrics, or other identifying indicia permitting access and disposition of money held in any particular external account 25.

Referring back to FIG. 1, the banks 24 provide to the administrative services module 18 a plurality of paid files 36. Each bank 24 also can provide periodically an outstanding liability file 38. Alternatively, each outstanding liability file 38 can be incorporated into the corresponding paid file 36. Referring again to FIG. 2, each paid file 36 and each outstanding liability file 38 includes one or more status reports 40. Each status report 40 includes a transaction amount 30, bank information 34, and a status code 42. The status code 42 can be, for example, any of "paid", "issued", "rejected", "stopped", "voided", or "escheated", and reflects completion or non-completion of a previously issued bank transaction 26. Typically, the outstanding liabilities files 32 are composed of status reports 40 in which the status code 42 indicates non-completion of a previously issued payment bank transaction 26.

Referring back to FIG. 1, the claim processing subsystem 12 forwards the claims detail file 22 to the Sub Ledger 44, which updates a transaction history 46 based on at least some of the claim transactions 14. The Sub Ledger 44 also includes a balance reconciliation engine 48, which is further discussed below.

Still referring to FIG. 1, the administrative services module 18 includes a transactions matching engine 50, which performs a three-way match between bank transactions 26 from the issue files 20, transaction confirms 28 from the claims detail files 22, and status reports 40 from the paid files 36. The transactions matching engine 50 compares the bank transactions 26 to the transaction confirms 28 in order to validate each bank transaction 26 corresponding to one of the transaction confirms 28. The transactions matching engine 50 also compares the bank transactions 26 to the status reports 40 in order to identify completed bank transactions 26. The transactions matching engine 50 periodically generates a matched file 51 including each status report 40 that has been matched to a bank transaction 26 and to a transaction confirm 28. The administrative services module 18 sends the matched file 51 to the Sub Ledger 44, which updates the transaction history 46 based on the matched file 51. In one embodiment, the transaction history 46 is updated by appending an "M" to each status report 40 received in the matched file 51. The computerized system 10 also includes a basic loss control module 52, which updates a general ledger 53 based on information pulled from the claim processing subsystem 12, and provides a periodic feed of transaction level detail to the Sub Ledger 44 for use by the balance reconciliation engine 48.

Figure 3:
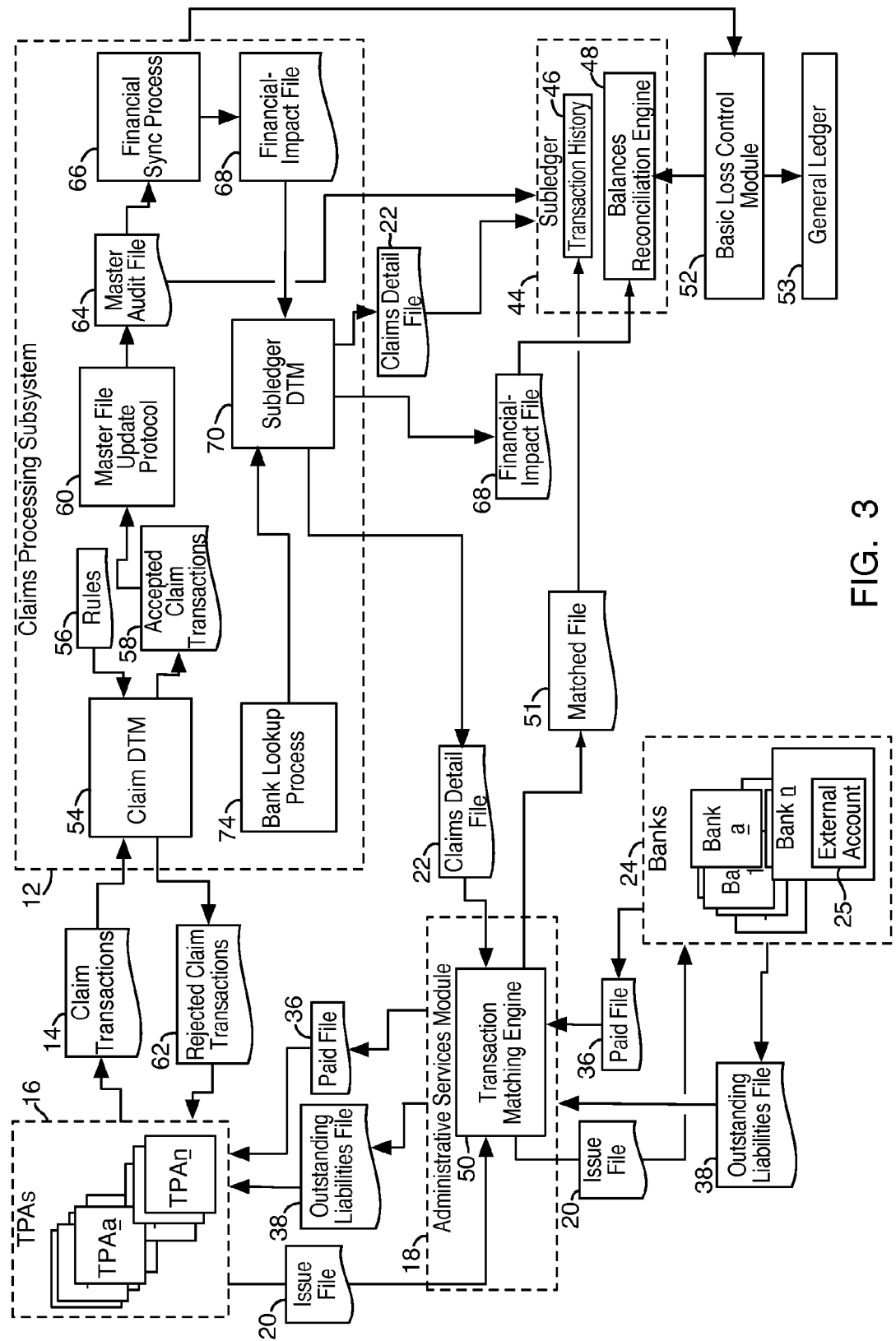
FIG. 3 is a detailed schematic illustration of the system shown in FIG. 1.

Referring to FIG. 3, the claim processing subsystem 12 includes a claim data throughput module (DTM) 54 configured to accept or reject each of the claim transactions 14 based on formal rules 56. The claim DTM 54 passes accepted claim transactions 58 to a master file update protocol 60 and reports rejected claim transactions 62 to the TPAs 16.

The master file update protocol 60 incorporates the accepted claim transactions 58 into a master audit file 64 also including internally-generated claim transactions 65, and passes the master audit file 64 to a financial sync process 66. The master file update protocol 60 also sends the master audit file 64 to the Sub Ledger 44. The balance reconciliation engine 48 periodically pulls claim balances 67 from each of the TPAs 16, and uses the master audit file 64 and the transaction level details fed from the basic loss control module 52 to reconcile the claim transactions 14 against the claim balances 67.

Still referring to FIG. 3, the financial sync process 66 produces a financial-impact file 68 based on the accepted claim transactions 58, and passes the financial-impact file 68 through a Sub Ledger DTM 70 to the Sub Ledger 44. Referring again to FIG. 2, the financial-impact file 68 includes a plurality of accepted TPA-originated claim transactions 58, as well as non-TPA-originated or internally-generated transactions 65. Some of the transactions in the financial-impact file are funded, others are unfunded. Each accepted claim transaction 58 includes a claim identifier 69 as well as a transaction amount 30 and a transaction code 32.

Referring back to FIG. 3, the Sub Ledger DTM 70 generates the claims detail file 22 by filtering the financial-impact file 68 to exclude non-TPA-originated and non-funded claim transactions. The Sub Ledger DTM 70 then accesses a bank lookup table 74 in order to obtain bank information 34, which the Sub Ledger DTM 70 appends to each accepted claim transaction 58 within the claims detail file 22. Appending the bank information 34 transforms the accepted claim transactions 58 into transaction confirms 28. The Sub Ledger DTM 70 then passes the claims detail file 22 and the financial-impact file 68 to the Sub Ledger 44, and also passes the claims detail file 22 to the administrative services module 18.

Figure 4:
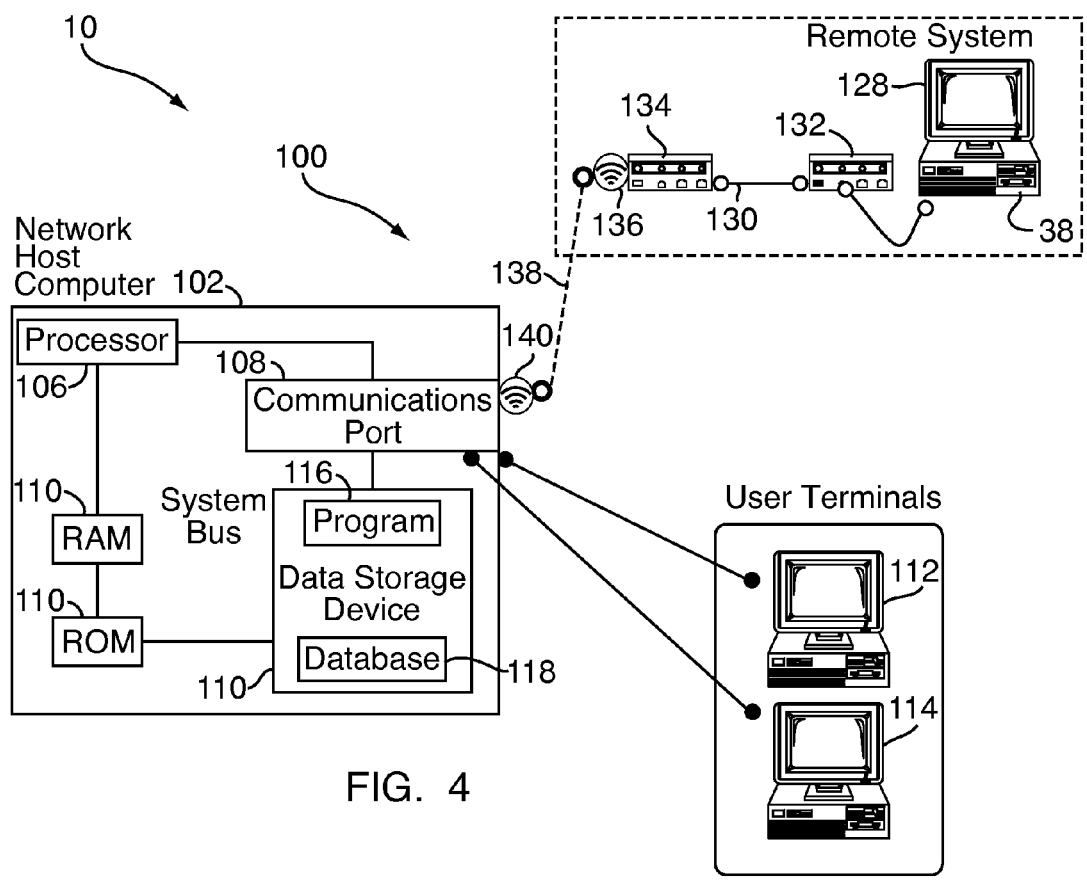
FIG. 4 is a schematic illustration of the system shown in FIG. 1, implemented using a network host computer.
Figure 5:
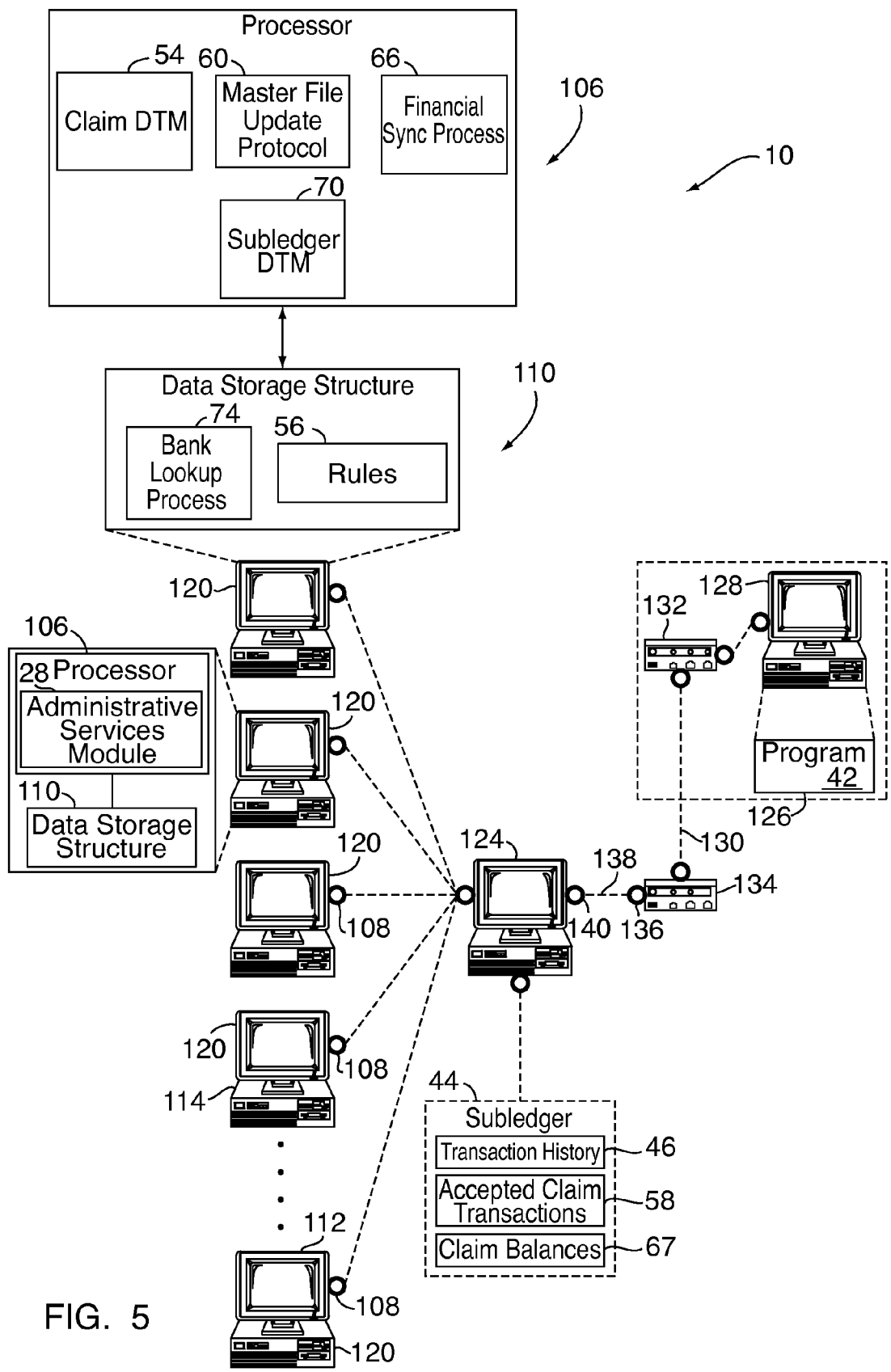
FIG. 5 is a schematic illustration of the system shown in FIG. 1, implemented using distributed network architecture.

The computerized system 10 may be implemented in many different ways. For example, the computerized system 10 may be implemented in a central server architecture 100 that is centered on a conventional network host computer 102, as shown in FIG. 4. Alternatively, and preferably, the computerized system 10 can be implemented in a distributed network architecture 104, as shown in FIG. 5.

Referring to FIG. 4, the network host computer 102 includes at least one controller, processor, or central processing unit (CPU) 106, at least one communication port 108, and one or more data storage structures 110. The processor 106 may include one or more conventional microprocessors and one or more supplementary co-processors such as math co-processors. The communication port 108 may include multiple communication channels for simultaneous communication with, for example, other processors, servers or client terminals 112, or a display unit 114. Devices in communication with each other need not be continually transmitting to each other. On the contrary, such devices need only transmit to each other as necessary, may actually refrain from exchanging data most of the time, and may require several steps to be performed to establish a communication link between the devices.

For example, the communication port 108 may include wire modems, wireless radio, infrared, visible laser, or UV laser transceivers, or audio transceivers. The communication port 108 and the one or more data storage structures 110 are in communication with the processor 106 to facilitate the operation of the network host computer 102. The data storage structures 110 may comprise an appropriate combination of magnetic, optical and/or semiconductor or flash memory, and may include, for example, RAM, ROM, an optical disc such as a compact disc and/or a hard disk or drive. The processor 106 and the data storage structures 110 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wireline medium.

At least one of the data storage structures 110 is encoded with (i) a program and/or algorithm(s) 116 (e.g., computer program code and/or a computer program product) adapted to configure one or more of the processors 106 to emulate the various modules of the computerized system 10, as described in detail hereinafter; and/or (ii) at least one database 118 configured to store information required, manipulated, or produced by the computerized system 10 in execution of the program 116, such as, for example, the claims detail file 22, the Sub Ledger 44, or the transactions matching engine 50.

The computer program 116 for configuring the processor 106 to implement the computerized system 10 (and other functions described herein) can be developed by a person of ordinary skill in the art, and is not described in detail herein. Suitable computer program code may also be provided for performing numerous other functions such as generating notifications at selected time intervals. For example, in addition to instructions for configuring the processor 106 to implement the computerized system 10, the program 116 also may include program elements such as an operating system, a database management system and "device drivers" that allow the processor to interface with computer peripheral devices (e.g., a video display, a keyboard, a computer mouse). The processor 106 may read the instructions of the program 116 from the data storage structures 110. The program 116 may be stored, for example, in a compressed, an uncompiled and/or an encrypted format, and may include computer program code. While execution of sequences of instructions in the program 116 will configure the processor 106 to emulate one or more of the modules of the computerized system 10, hard-wired circuitry may be used in place of, or in combination with, software instructions for implementation of the computerized system 10. Thus, embodiments of the present invention are not limited to any specific combination of hardware and software.

Each user device or computer or client terminal 112 may include any one or a combination of a keyboard, a computer display, a touch screen, LCD, voice recognition software, an optical or magnetic read head, or other input/output devices required to implement the above functionality. Each display unit 114 may include any one or a combination of a computer display, a printer, a CD/DVD burner, a magnetic tape drive, a magnetic disk drive, an LCD array, a voice speaker, a network connection, or similar output device. At least one of the user devices or computers or client terminals 112, or of the display units 114, may be configured according to the computer program 116, or according to other instructions, to provide various user interfaces for receiving data and for displaying messages including display of any of the various files 20, 22, 36, 42, 64, 68, or 76 and/or the alerts 80.

Referring to FIG. 5, wherein, similar numbers indicate components similar to those shown in FIG. 4, the distributed network architecture 104 includes several module servers 120a-n and at least one data server 122 connected by a communications hub 124. Each of the module servers 120a-n includes at least one associated processor 106, at least one communication port 108, and one or more data storage structures 110. The data server 122 is configured to maintain the database 118 in response to instructions and queries received from the various module servers 120a-n, according to the program 116. The communications hub 124 serves as a primary communication link between the module servers 120, the data server 122, and other servers, client or user terminals 112 and related devices including one or more display units 114. The communications hub 124 may have minimal processing capability itself, serving primarily as a communications router, or may also act as another module server 120. A variety of communications protocols may be part of the system, including but not limited to: Ethernet, SAP, SAS™, ATP, Bluetooth, and TCP/IP.

In the distributed network architecture 104, as shown in FIG. 5, each of the module servers 120 is configured by execution of the program 116 to emulate one or more of the various modules of the computerized system 10. For example, module server 120a may be configured by the program 116 to emulate the claim DTM 44, the master file update protocol 46, the financial sync process 54, the Sub Ledger 20, the Sub Ledger DTM 64, and the bank lookup process 66, while module server 120b may be configured by the program 116 to emulate the administrative services module 28.

In the central server architecture 100 shown in FIG. 4 or in the distributed network architecture 104 shown in FIG. 5, the program 116 may be embodied in a computer-readable medium 126, other than any of the data storage structures 110, that provides or participates in providing instructions to the processor 106 (or any other processor of a computing device described herein) for execution. The computer-readable medium 126 may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Transmission media include coaxial cables, copper wire and fiber optics, including the wires that comprise a system bus coupled to the processor. Transmission media may carry acoustic or light waves, such as those generated during radio frequency (RF) and infrared (IR) data communications. Common forms of the computer-readable medium 126 can include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave encoded with data by amplitude, phase, and/or frequency modulation, or any other medium from which a computer can read. Various forms of the computer-readable medium 126 may be involved in configuring the processor 106 (or any other processor of a device described herein) to implement the computerized system 10. For example, as shown in FIG. 5, the program 116 may initially be borne on a magnetic disk of a remote computer 128. The remote computer 128 can load the instructions into its dynamic memory and send the instructions over a telephone line 130 using a first modem 132. A second modem 134 local to the communications hub 124 can receive the data on the telephone line 130 and can use an infrared transmitter 136 to convert the data to a wireless signal 138. An infrared detector 140 of the communications hub 124 can receive the data carried in the wireless signal 138 and can transfer the data through the communications hub 124 to one of the module servers 120 or to the data server 122. In addition, instructions may be received as electrical, electromagnetic, or optical signals, conveyed either on optical or electromagnetic cables or as wireless carrier waves that carry data streams representing various types of information.

One advantage of the present invention is that the interaction of the claim processing subsystem 12 and the administrative services module 18 with the TPAs 16 and the banks 24 enables insurer ownership of external accounts related to third-party-administered insurance policies. In particular, three-way matching of the bank transactions 26 to the transaction confirms 28 and to the status reports 40 enables insurer ownership of external accounts 25 without unacceptable financial exposures due to errors in transaction tracking. Another advantage of the present invention is that the interaction of the administrative services module 18, the Sub Ledger DTM 70, and the Sub Ledger 44 enables paid-check funding of external accounts related to third-party-administered insurance policies, as opposed to pre-funding the external accounts, thereby enhancing cash liquidity of an insurer without unacceptable financial exposure. Another advantage of the present invention is that the Sub Ledger 44 enables granular assessment of financial positions and exposures, both from a coverage- or policy-specific profitability perspective and from present and forecast cash flow perspectives.

Although the invention has been shown and described with respect to the detailed embodiments thereof, it will be understood by those skilled in the art that various changes in form and detail thereof may be made without departing from the spirit and the scope of the invention. For example, various formats and arrangements of the various files will be apparent to those skilled in the art. Similarly, it will be understood that the disclosed implementation of particular modules, processes, and protocols in particular servers, computers, or processors is only one of many possible embodiments of the invention, and that various modules, files, processes, or protocols may be combined or modified without departing from the teachings of the present disclosure.

What is claimed is:

1. A computerized system for an insurer to fund third-party-administered insurance claims comprising:
    at least one processor configured to:
        receive, from a third party administrator, an issue file comprising a plurality of bank transactions;
        wherein each of the plurality of bank transactions in the issue file is adapted to be executed by an insurer's bank to make a payment to a claimant from an insurer-owned bank account, each of the plurality of bank transactions including a transaction amount, a transaction code related to an action to be taken with regard to the insurer-owned bank account, and bank information for permitting access and disposition of money held in the insurer-owned bank account for payment to the claimant;
        compare the plurality of bank transactions in the issue file to a plurality of transaction confirms corresponding to a plurality of insurance claim transactions that have been accepted based on formal rules;
        wherein each of the plurality of transaction confirms includes a transaction amount, a transaction code related to an action to be taken with regard to the insurer-owned bank account, and bank information for permitting access and disposition of money held in the insurer-owned bank account for payment to the claimant;
        validate one or more of the plurality of bank transactions in the issue file if the transaction amount, transaction code, and bank information in a corresponding one of the plurality of transaction confirms match;
        pass the issue file received from the third party administrator to the insurer's bank so that the one or more of the plurality of bank transactions that have been validated are executed by the insurer's bank to make the payment to the claimant from the insurer-owned bank account;
        receive from the insurer's bank a paid file comprising a plurality of status reports corresponding to the plurality of bank transactions that have been validated;
        wherein each of the plurality of status reports includes a transaction amount, bank information, and a status code indicating the status of a corresponding one of the plurality of bank transactions;
        compare the plurality of bank transactions in the issue file to the plurality of status reports in the paid file received from the insurer's bank; and
        determine whether one or more of the plurality of bank transactions in the issue file is complete based on the status code in a corresponding one of the plurality of status reports in the paid file and whether the transaction amount and bank information in the corresponding one of the plurality of status reports in the paid file match.

2. The computerized system according to claim 1, wherein the at least one processor is further configured to update the transaction history to reflect completion of the one or more of the plurality of bank transactions that have been validated.

3. The computerized system according to claim 1, further comprising: at least one data storage structure configured to store a master audit file.

4. The computerized system according to claim 1, further comprising: at least one data storage structure configured for storing a matched file produced by matching the plurality of bank transactions in the issue file, the plurality of transaction confirms and the status reports in the paid file.

5. The computerized system according to claim 1, wherein the at least one processor is further configured to update at least one Sub Ledger based on one or more of the plurality of insurance claim transactions that have been accepted and are contained in a financial-impact file.

6. The computerized system according to claim 1, wherein the at least one processor is further configured to accept or reject one or more of the plurality of insurance claim transactions provided from the third party administrator.

7. The computerized system according to claim 1, wherein the at least one processor is further configured to implement a master file update protocol for generating an audit file based on one or more of the plurality of insurance claim transactions provided from the third party administrator.

8. The computerized system according to claim 1, wherein the at least one processor is further configured to implement a financial sync process for generating a financial-impact file correlating at least one policy account to at least one of the plurality of bank transactions that have been accepted.

9. The computerized system according to claim 1, wherein the at least one processor is further configured to implement a bank lookup process for generating the plurality of transaction confirms based on the plurality of insurance claim transactions that have been accepted and that are contained in a financial-impact file.

10. A non-transitory computer-readable medium encoded with instructions for configuring at least one processor to:
    accept, based on formal rules, at least one insurance claim transaction received from at least one third party administrator;
    receive, from a third party administrator, in the issue file being adapted to be executed by an insurer's bank to make a payment to a claimant from an insurer-owned bank account;
    wherein each of the plurality of bank transactions includes a transaction amount, a transaction code related to an action to be taken with regard to the insurer-owned bank account, and bank information for permitting access and disposition of money held in the insurer-owned bank account for payment to the claimant;
    compare the plurality of bank transactions in the issue file to a plurality of transaction confirms corresponding a plurality of insurance claim transactions that have been accepted based on formal rules;
    wherein each of the plurality of transaction confirms includes a transaction amount, a transaction code related to an action to be taken with regard to the insurer-owned bank account, and bank information for permitting access and disposition of money held in the insurer-owned bank account for payment to the claimant;

validate one or more of the plurality of bank transactions in the issue file if the transaction amount, transaction code, and bank information in a corresponding one of the plurality of transaction confirms match;

pass the issue file received from the third party administrator to the insurer's bank so that the one or more of the plurality of bank transactions that have been validated are executed by the insurer's bank to make the payment to the claimant from the insurer-owned bank account;

receive from the insurer's bank a paid file comprising a plurality of status reports corresponding to the plurality of bank transactions that have been validated;

wherein each of the plurality of status reports includes a transaction amount, bank information, and a status code indicating the status of a corresponding one of the plurality of bank transactions;

compare the plurality of bank transactions in the issue file to the plurality of status reports in the paid file received from the insurer's bank; and determine whether one or more of the plurality of bank transactions in the issue file is complete based on the status code in a corresponding one of the plurality of status reports in the paid file and whether the transaction amount and bank information in the corresponding one of the plurality of status reports in the paid file match.

11. The non-transitory computer-readable medium according to claim 10, also encoded with instructions for configuring at least one data storage structure to store information related to at least one policy account, and with instructions for configuring at least one processor to update a Sub Ledger to reflect completion of the at least one validated bank transaction one or more of the plurality of bank transactions that have been validated.

12. The non-transitory computer-readable medium according to claim 10, also encoded with instructions for configuring at least one data storage structure to store an audit file.

13. The non-transitory computer-readable medium according to claim 10, also encoded with instructions for configuring at least one data storage structure to store a matched file produced by the transactions matching engine by matching the plurality of bank transactions in the issue file, the plurality of transaction confirms and the status reports in the paid file.

14. The non-transitory computer-readable medium according to claim 10, also encoded with instructions for configuring at least one processor to update a Sub Ledger according to the at least one paid file provided from the at least one bank received from the insurer's bank.

15. The non-transitory computer-readable medium according to claim 10, also encoded with instructions for configuring at least one processor to accept or reject one or more of the plurality of insurance claim transactions provided from at least one the third party administrator.

16. The non-transitory computer-readable medium according to claim 10, also encoded with instructions for configuring at least one processor to generate an audit file based on accepted insurance claim transactions the plurality of insurance claim transactions that have been accepted.

17. The non-transitory computer-readable medium according to claim 10, also encoded with instructions for configuring at least one processor to generate a financial-impact file correlating at least one policy account to the at least one accepted insurance claim transaction of the plurality of insurance claim transactions that have been accepted.

18. The non-transitory computer-readable medium according to claim 10, also encoded with instructions for configuring at least one processor to update a Sub Ledger based on accepted one or more of the plurality of insurance claim transactions that have been accepted and are contained in a financial-impact file.

19. The non-transitory computer-readable medium according to claim 10, also encoded with instructions for configuring at least one processor to generate claim transactions based on accepted insurance claim transactions the plurality of transaction confirms based on the plurality of insurance claim transactions that have been accepted and that are contained in a financial-impact file.

20. A computer-implemented method for funding third-party-administered claim transactions comprising the steps of:

receiving, from a third party administrator via a processor, a plurality of claim transactions;

accepting, based on formal rules via the processor, one or more of the plurality of claim transaction;

receiving, from the third party administrator via the processor, an issue file comprising a plurality of bank transactions, each of the plurality of bank transactions corresponding to one of the plurality of insurance claim transactions, each of the plurality of bank transactions in the issue file being adapted to be executed by an insurer's bank to make a payment to a claimant from an insurer-owned bank account;

wherein each of the plurality of bank transactions includes a transaction amount, a transaction code related to an action to be taken with regard to the insurer-owned bank account, and bank information for permitting access and disposition of money held in the insurer-owned bank account for payment to the claimant;

comparing, via the processor, the plurality of bank transactions in the issue file to a plurality of transaction confirms corresponding to some of the plurality of insurance claim transactions that have been accepted based on the formal rules;

wherein each of the plurality of transaction confirms includes a transaction amount, a transaction code related to an action to be taken with regard to the insurer-owned bank account, and bank information for permitting access and disposition of money held in the insurer-owned bank account for payment to the claimant;

validating, via the processor, one or more of the plurality of bank transactions in the issue file if the transaction amount, transaction code, and bank information in a corresponding one of the plurality of transaction confirms matches;

passing, via the processor, issue file received from the third party administrator to the insurer's bank so that the one or more of the plurality of bank transactions that have been validated are executed by the insurer's bank to make the payment to the claimant from the insurer-owned bank account;

receiving, from the insurer's bank via the processor, a paid file comprising a plurality of status reports corresponding to the plurality of bank transactions that have been validated;

wherein each of the plurality of status reports includes a transaction amount, bank information, and a status code indicating the status of a corresponding one of the plurality of bank transactions; and verifying, via the processor, whether one or more of the plurality of bank transactions in the issue file is complete based on the status code in a corresponding one of the plurality of status reports in the paid file and whether the transaction amount and bank information in the corresponding one of the plurality of status reports in the paid file match.

\* \* \* \* \*